United States Patent

Sudo et al.

[11] Patent Number: 5,801,768
[45] Date of Patent: Sep. 1, 1998

[54] PURITY ADJUSTING APPARATUS USING BEAM POSITION SIMULATION

[75] Inventors: Yasunobu Sudo; Toshimi Kobori, both of Utsunomiya, Japan

[73] Assignee: Matsushita Electric Industrial Co., Ltd., Osaka, Japan

[21] Appl. No.: 669,612

[22] Filed: Jun. 24, 1996

[30] Foreign Application Priority Data

Jun. 24, 1995 [JP] Japan ................................. 7-180862

[51] Int. Cl.$^6$ .................. H04N 17/00; H04N 17/02
[52] U.S. Cl. .................. 348/191; 348/190; 315/368.11; 315/11.5
[58] Field of Search ..................... 348/191, 190, 348/189, 184, 185, 180, 177, 178, 179, 807; 315/368.11, 11.5; 313/430; H04N 17/00, 17/02, 17/04

[56] References Cited

U.S. PATENT DOCUMENTS

| | | | |
|---|---|---|---|
| 4,035,834 | 7/1977 | Drury | 348/191 |
| 4,137,548 | 1/1979 | Kelly et al. | 348/190 |
| 4,602,272 | 7/1986 | Duschl | 348/191 |
| 4,635,095 | 1/1987 | Legrand et al. | 348/191 |
| 4,814,858 | 3/1989 | Mochizuki et al. | 348/191 |
| 5,432,549 | 7/1995 | Hassler et al. | 348/191 |

FOREIGN PATENT DOCUMENTS

| | | |
|---|---|---|
| 61-74495 | 9/1984 | Japan . |
| 2-58487 | 8/1988 | Japan . |
| 3-17695 | 6/1989 | Japan . |
| 1 506 749 | 4/1978 | United Kingdom . |
| 1 586 201 | 3/1981 | United Kingdom . |
| 2 255 700 | 11/1992 | United Kingdom . |
| 93/06694 | 4/1993 | WIPO . |

OTHER PUBLICATIONS

Search report dated 22 Aug. 1996.

*Primary Examiner*—Michael Lee
*Attorney, Agent, or Firm*—Ratner & Prestia

[57] ABSTRACT

Adjustment of an electron beam landing position during thermal expansion of a shadow mask in a color cathode ray tube (CRT) on a production line of color television receivers is performed by calculating an optimum compensation value and converting the compensated data into a coordinate value and displaying it on the screen to decrease the conducting time of the CRT, and improve accuracy and uniformity of purity adjustment. A purity adjusting apparatus includes a time measuring part for measuring the conducting time of a color CRT, a reference drift data calculating part for storing thermal expansion characteristics of a shadow mask of the color CRT, a temperature/brightness measuring part for measuring temperature and brightness of the faceplate of the color CRT, a computing part for calculating compensation value of the beam landing position from the above data, and a display part for displaying an aiming point presuming perfect stabilization against the thermal expansion of the shadow mask from the calculated result on a monitor. Thus, purity can be adjusted in a shorter period and with better accuracy.

5 Claims, 8 Drawing Sheets

PURITY ADJUSTING APPARATUS USING BEAM POSITION SIMULATION

BACKGROUND OF THE INVENTION

The present invention relates to a purity adjusting apparatus which can adjust purity before a color cathode ray tube (CRT) reaches a thermally stable state by simulating a correct electron beam landing position of the color CRT.

Figure 8A:
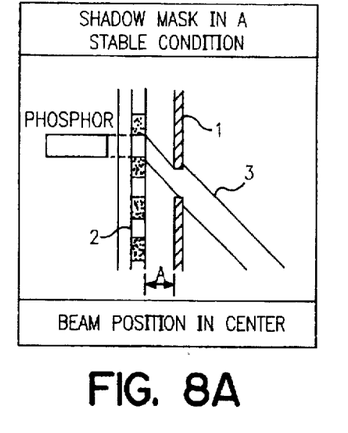
FIG. 8(a) illustrates a partially enlarged cross section of a CRT screen showing a beam landing state when the shadow mask reaches a stable state.
Figure 8B:
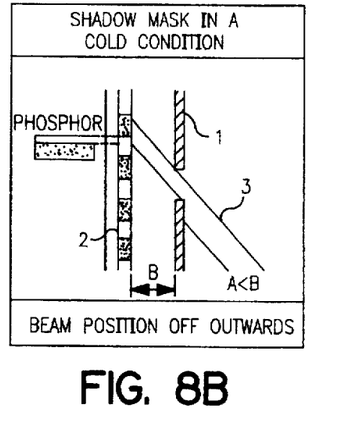
FIG. 8(b) illustrates a partially enlarged cross section of a CRT screen showing a beam landing state when the shadow mask is cool (before being heated).
Figure 8C:
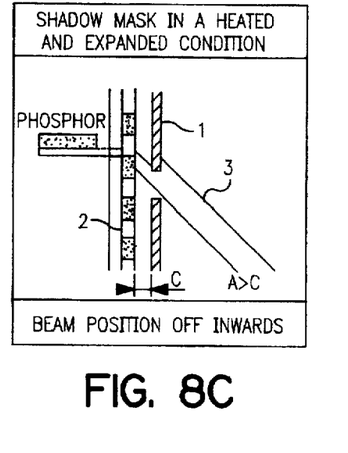
FIG. 8(c) illustrates a partially enlarged cross section of a CRT screen showing a beam landing state when the shadow mask is heated and expands.

In a production line of color television receivers, the purity of a color CRT has to be adjusted after waiting until its shadow mask sufficiently comes to a thermal stable state. In FIG. 8(a), when a shadow mask 1 reaches a thermally stable state, an electron beam 3 strikes the center of a phosphor dot. When the shadow mask 1 is cool, that is, before the heater is turned on, the gap B between shadow mask 1 and phosphor surface 2 becomes larger than the gap A when the shadow mask 1 is in a thermally stable state, the beam 3 strikes the phosphor surface 2 in a form of outward deviation as shown in FIG. 8(b). When the shadow mask 1 is excessively heated and expands due to its internal heat dissipation, the gap C between the shadow mask 1 and the phosphor surface 2 becomes smaller than the gap A and the electron beam 3 strikes the phosphor surface 2 in a form of inward deviation as shown in FIG. 8(c). If the purity is adjusted before the shadow mask sufficiently reaches a thermal stable state, the beam landing position is off from the center of the phosphor dot when it reaches a stable state. Therefore, the beam landing position on the phosphor dot has to be adjusted after aging for a designated time; that is, the television receiver is unceasingly turned on for a designated period before confirming that the thermal expansion of the shadow mask 1 is perfectly stable. At least 20 minutes is necessary for the aging including preparation and rough adjustment.

Because the radiated heat quantity of a CRT varies due to the temperature of the CRT itself and its environment, the purity has to be adjusted by correcting the beam landing position little by little.

In a mass production factory of television receivers, total conveyor length has to be generally made longer to increase a production quantity or to manufacture receivers with additional functions. On the contrary, the total conveyor length cannot be made longer because of a restriction in factory size. In a previous production method, there are some problems such as it takes long time to adjust the purity, the conveyor has to be elongated because fine adjustment is necessary due to temperature variation of the environment and further it is difficult to get uniform purity accuracy throughout the year.

SUMMARY OF THE INVENTION

The present invention aims to shorten the purity adjustment time and improve the adjustment accuracy in a production line of color television receivers.

To solve the problems, the present invention presents a purity adjusting apparatus using beam position simulation of a color CRT including:

time measuring part for measuring a conducting time from the time when the conduction starts to the time when the purity of a color CRT of a color television receiver to be purity adjusted is adjusted;

reference drift data calculating part for (1) sorting data indicating a relation between a landing position deviation of the electron beam due to thermal expansion of a shadow mask inside said color CRT by heat generated when the electron beam passes through the shadow mask and the conducting time and (2) calculating reference drift data for a reference temperature and a reference brightness on the beam landing position at the time when the purity is adjusted from the conducting time data supplied from the time measuring part;

temperature/brightness measuring part for measuring the temperature and brightness on the faceplate of the color CRT;

computing part for calculating an optimum beam landing position to strike the phosphor of a designated color at the time when the purity is adjusted and converting the data of the calculated optimum beam landing position into (X, Y) coordinates data, being inputted with the temperature data and the brightness data supplied from the temperature/ brightness measuring part and the reference drift data supplied from the reference drift data calculating part; and display part for displaying an aiming position on the (X, Y) coordinates indicating the optimum beam landing position supplied from the computing part and displaying a marker on the (X, Y) coordinates indicating the beam landing position;

and wherein the purity is adjusted, corresponding to the designated color by making the marker coincide with the aiming position.

Thus, the purity can be adjusted similar to the case in which thermal expansion of the shadow mask becomes perfectly stable even during thermal expansion process. This results in reduction of conducting time.

DETAILED DESCRIPTION OF THE INVENTION

Figure 1:
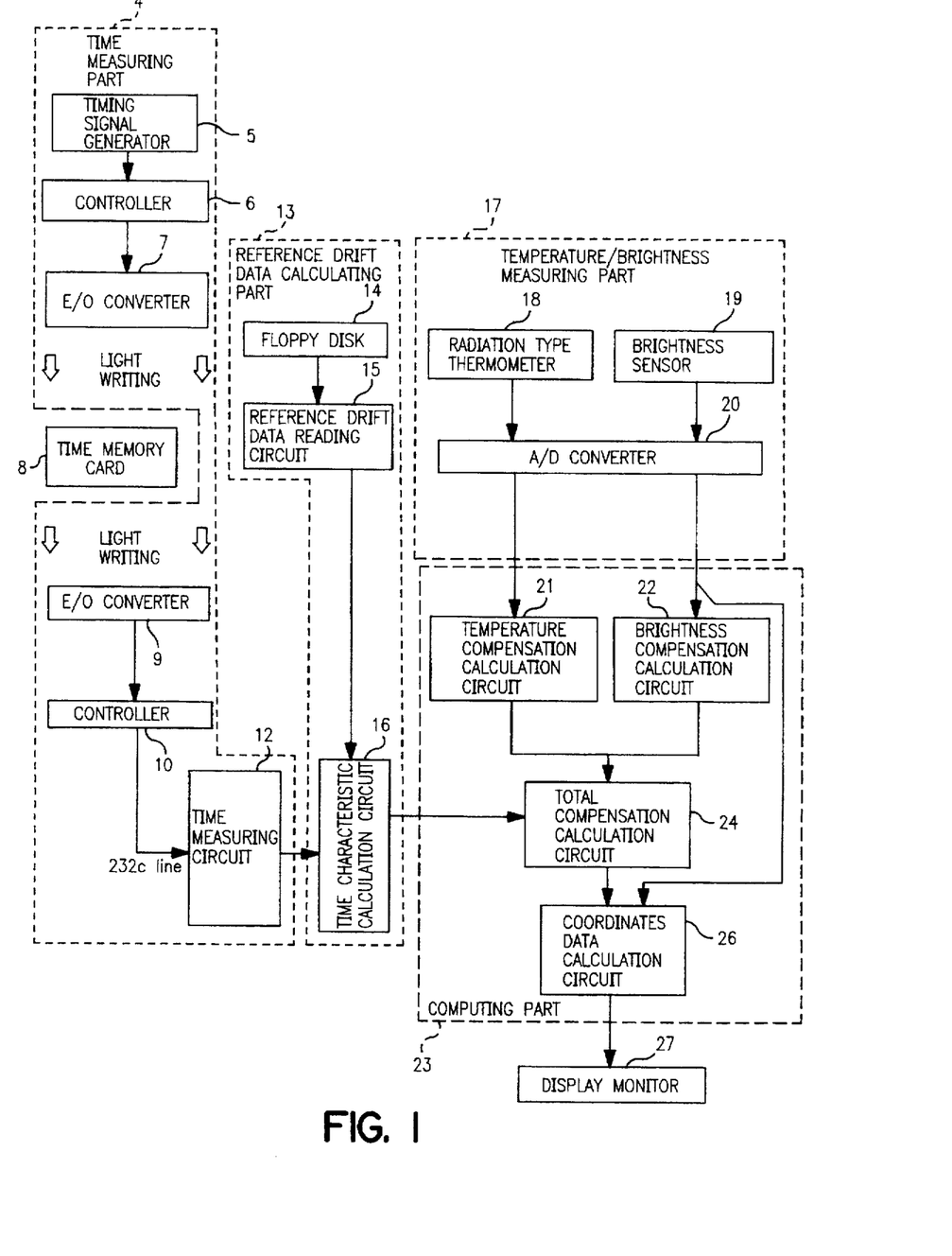
FIG. 1 is a block diagram of a purity adjusting apparatus using beam landing position simulation in accordance with an exemplary embodiment of the present invention.

FIG. 1 is a block diagram of a purity adjusting apparatus using beam position simulation in accordance with an exemplary embodiment of the present invention.

The function of a purity adjusting apparatus in accordance with an exemplary embodiment of the present invention is explained below, referring to FIG. 1. Assuming that the purity is adjusted about any one color of red (R), green (G) and blue (B), the description concerning the color is omitted hereafter. The block 4 is a time measuring part for measuring a time from the time when a television receiver on a palette carried on a production line is turned on and the CRT starts conducting to the time when purity is adjusted. Timing data generated at a time signal generator 5 is converted into, for example a hexadecimal number at a controller 6, transmitted from an E/O converter 7 to a time memory card 8 attached on the above-mentioned palette as a light data signal on the production line. When the palette carrying the television receiver reaches the place where the purity is adjusted on the production line, the light data signal from the time memory card 8 is converted into an electric signal at an O/E converter 9, converted from a hexadecimal number into an original timing data at a controller 10 and supplied to a time measuring circuit 12 through a 232C line.

The individual conducting time of every television receiver on the production line can be calculated at the time measuring circuit 12 by subtracting the time generated at the timing signal generator 5 from the arrived time of the television receiver to be adjusted using a clock signal generated at a computing part 23.

The data of the deviation of the beam landing position due to thermal expansion of a shadow mask at a reference temperature and a reference brightness of a CRT faceplate measured for conducting time is called reference drift data.

At a reference drift data calculating part 13, reference drift data for each type number of CRT is stored by filing in a floppy disk 14 and reference drift data for a desired type number of CRT can be read by inputting a key word for a desired type number of CRT in a reference drift data reading circuit 15. The reference drift data at the moment is outputted from a time characteristic calculation circuit 16, being supplied with conducting time data calculated at time measuring circuit 12.

At a temperature/brightness measuring part 17, the temperature of the CRT faceplate is measured by a radiated type thermometer 18 such as an infrared thermometer and the brightness of the CRT is measured by a brightness sensor 19. Each measured value is converted into digital data at an A/D converter 20 and is inputted to a computing part 23.

Although the temperature of the CRT faceplate is influenced by internal heat dissipation, it is very small and the temperature of the CRT faceplate is close to the environmental temperature.

At a computing part 23, the deviation of the beam landing position due to a difference between the actual faceplate temperature and the reference faceplate temperature is calculated at a temperature compensation calculation circuit 21 and the calculated value is outputted as a temperature drift compensation data. Similarly, the deviation of the beam landing position due to a difference between the actual CRT brightness and the reference CRT brightness is calculated at a brightness compensation calculation circuit 22 and the calculated value is outputted as a brightness drift compensation data. The calculation is described below.

These two compensation data and the reference drift data which is an output of time characteristic calculation circuit 16 are inputted to a total compensation calculation circuit 24, added there and compensated as an optimum beam landing position under the present condition. Further, the characteristic data before and after compensation are compared and if it is confirmed that a limit range is not exceeded, the compensated data is calculated as an optimum aiming data expressing an optimum beam landing position at a coordinates data calculation circuit 26.

The beam landing position indicating the beam position at the present moment is calculated at coordinates data calculation circuit 26, on the basis of information from brightness sensor 19 converted into digital data at A/D converter 20. The above-described two data, the optimum aiming position data and the beam landing position data, are converted into (X, Y) coordinates data at coordinates data calculation circuit 26 and outputted as coordinates data signals. The coordinates data signals are supplied to a display monitor 27 and the signal supplied from thermometer 18 and brightness sensor 19 passing through total compensation calculation circuit 24 to coordinates data calculation circuit 26 is displayed as an optimum aiming position. The signal supplied from brightness sensor 19 without passing through compensation calculation circuits 22 and 24 to coordinates data calculation circuit 26 is displayed as an adjusting marker in a display monitor 27.

Figure 2:
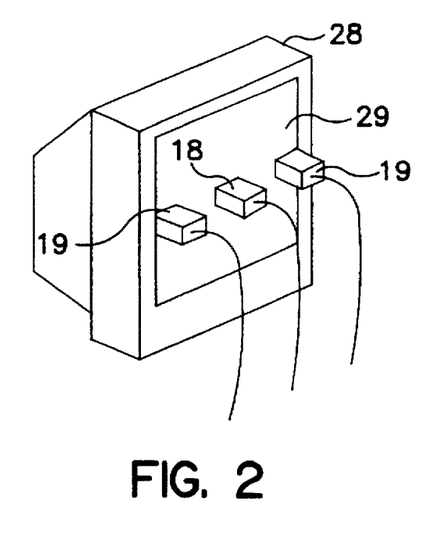
FIG. 2 illustrates a measurement of the temperature and the brightness of a television receiver to be adjusted in accordance with the exemplary embodiment of the present invention.

FIG. 2 illustrates measurements of the temperature and the brightness of the CRT faceplate (screen) 29 of a television receiver 28 to be adjusted, in accordance with the exemplary embodiment of the present invention. A radiation type thermometer 18 faces the center of CRT faceplate 29 and measures the temperature of CRT faceplate 29. Two brightness sensors 19 are positioned at the right and left sides of the thermometer 18 and measure the brightness. A mean value of the data measured by two brightness sensors is inputted to A/D converter 20 as an output of brightness sensor 19.

Figure 3:
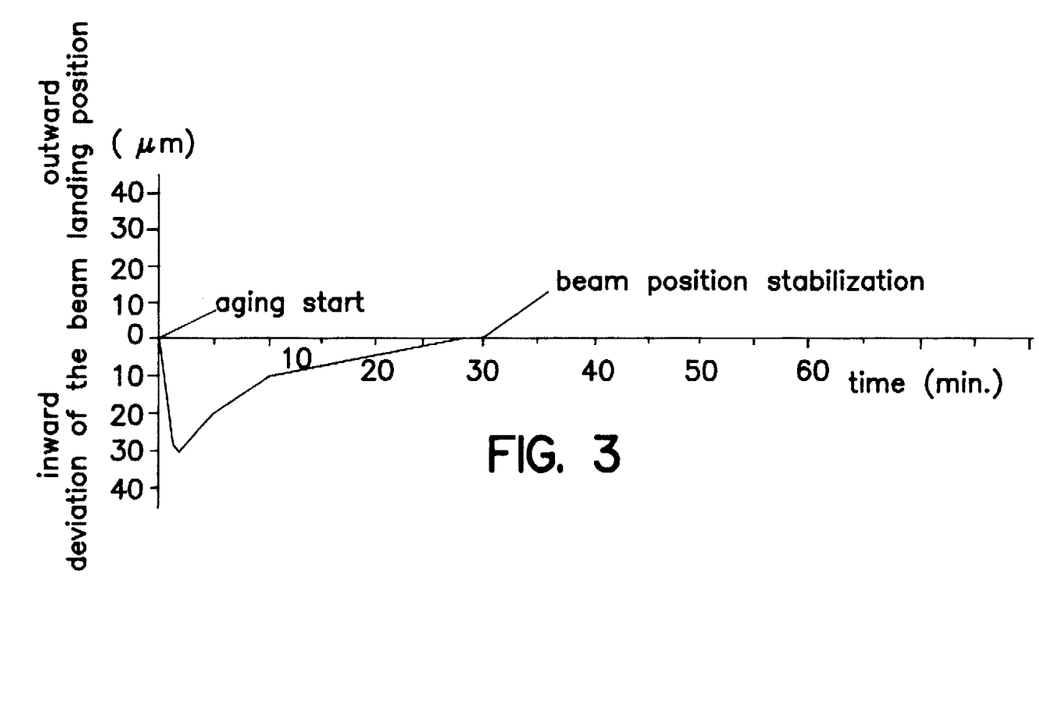
FIG. 3 is a typical drift of the beam landing position (beam landing position drift against conducting time) under a reference condition in accordance with the exemplary embodiment of the present invention.

FIG. 3 is a graph indicating a typical deviation (drift) of the beam landing position against the conducting time at a reference temperature and a reference brightness. The abscissa indicates conducting time in min. (minutes) from the time when the CRT starts conducting and the ordinate indicates deviation in μm (micrometers) of the beam landing position due to the heat expansion of the CRT shadow mask. The temperature and the brightness are considered to be 20° C. and 160 Cd/m$^2$ (Candles per square meter), respectively, as a reference. For example, the reference drift at 5 minutes of conducting time is −20 μm. The deviation of the beam landing position toward the outside is expressed as + and toward the inside is expressed as −. As described before, the reference drift data against the conducting time is stored in floppy disk 14 and when the conducting time data is inputted from time measuring circuit 12 to time characteristic calculation circuit 16, a reference drift data at that instance is outputted from time characteristic calculation circuit 16 and the output is supplied to total compensation calculation circuit 24.

Figure 4:
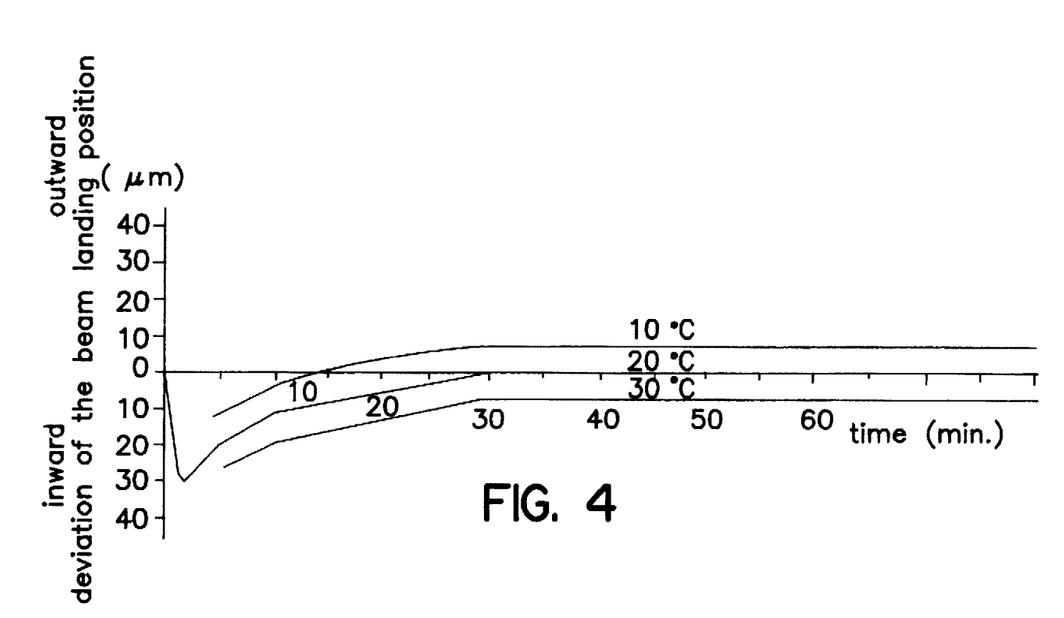
FIG. 4 is a graph indicating beam landing position drift against conducting time with a parameter of temperature in accordance with the exemplary embodiment of the present invention.

FIG. 4 is a graph indicating the beam landing position drift against the conducting time with a parameter of temperature of the CRT faceplate. The abscissa indicates conducting time in min. from the time when the CRT starts conducting and the ordinate indicates deviation in µm of the beam landing position due to heat expansion of the CRT shadow mask. When the temperature of the CRT faceplate varies from 10° C. to 30° C., the reference drift shown in FIG. 3 moves according to the temperature variation. In a 21 inch CRT, the deviation of the beam landing position is +6 µm at 10° C. and −6 µm at 30° C., assuming the reference temperature is 20° C.; that is, the deviation of the beam landing position is −0.6 µm per unit temperature difference.

Therefore, the deviation of the adjusting point at 15° C. of the faceplate temperature, that is, temperature drift compensation = (reference drift) µm/° C. ×                (eq. 1)

{(measured temperature) − (reference temperature)}° C. =

−0.6 µm/°C. × (15 − 20) °C. = +3 µm

The above calculation is executed at temperature compensation calculation circuit 21.

Figure 5:
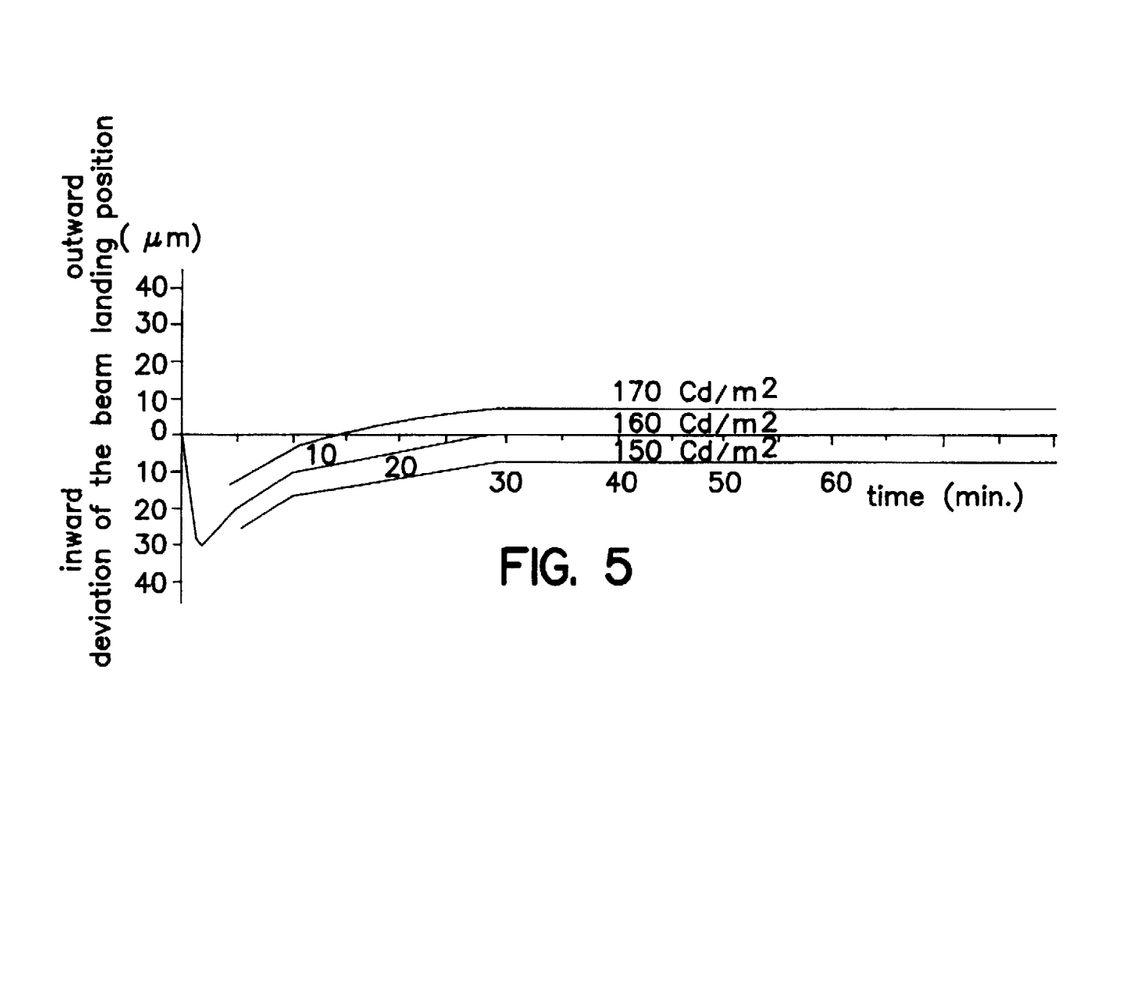
FIG. 5 is a graph indicating beam landing position drift against conducting time with a parameter of brightness in accordance with the exemplary embodiment of the present invention.

FIG. 5 is a graph indicating beam landing position drift against conducting time with a parameter of CRT brightness. The abscissa indicates a conducting time in min. from the time when the CRT starts conducting and the ordinate indicates a deviation in µm of the beam landing position due to heat expansion of the CRT shadow mask. When the CRT brightness varies at every 10 Cd/m$^2$, the reference drift shown in FIG. 3 moves according to the brightness variation. In a 21 inch CRT, the deviation of the beam landing position is −6 µm at +150 Cd/m$^2$, +6 µm at 170 Cd/m$^2$ assuming the reference brightness is 160 Cd/m$^2$; that is, the drift of the beam landing position is −0.6 µm per unit brightness difference.

Therefore, the deviation of the adjusting point at 140 Cd/m$^2$ of CRT brightness, that is brightness drift compensation = (reference drift) µm/Cd/m$^2$ ×           (eq. 2)

{(measured brightness) − (reference brightness)} Cd/m$^2$ =

+0.6 µm/Cd/m$^2$ × (140 − 160) Cd/m$^2$ = −12 µm

The above calculation is executed at brightness compensation calculation circuit 22.

The temperature drift compensation value calculated from the above (eq. 1) (that is, the output of temperature compensation calculation circuit 21) and the brightness drift compensation value calculated from the above (eq. 2) (that is, the output of brightness compensation calculation circuit 22) are added to the reference drift value (that is, the output of time characteristic calculation circuit 16) at total compensation calculation circuit 24 and beam landing position data compensated with the deformation due to the heat of the shadow mask against the conducting time of the CRT is outputted from total compensation calculation circuit 24.

Optimum beam landing position at purity adjustment =    (eq. 3)

(reference drift) + (temperature drift compensation) +

(brightness drift compensation)

In the above example,

= −20 µm + 3 µm − 12 µm

= −29 µm

As described above, the optimum beam landing position calculated at total compensation calculation circuit 24 is converted into (X, Y) coordinates data at a coordinates data calculation circuit 26 and is displayed on a display monitor 27 as an optimum aiming position. In the exemplary embodiment, the beam landing position is converted into a y ordinate value as x=0 at coordinates transformation.

Figure 6A:
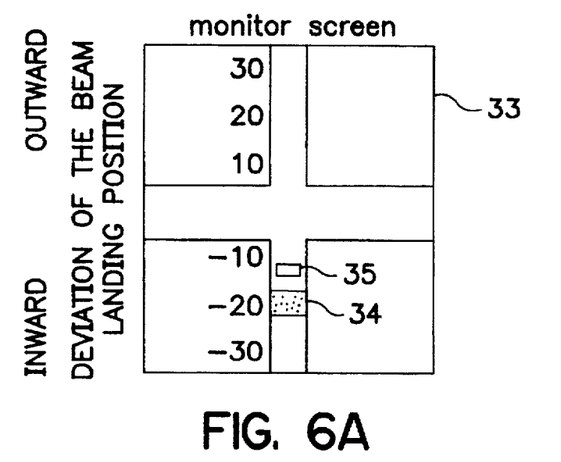
FIG. 6(a) illustrates pictures on a display monitor before introducing drift compensation data in accordance with the exemplary embodiment of the present invention.
Figure 6B:
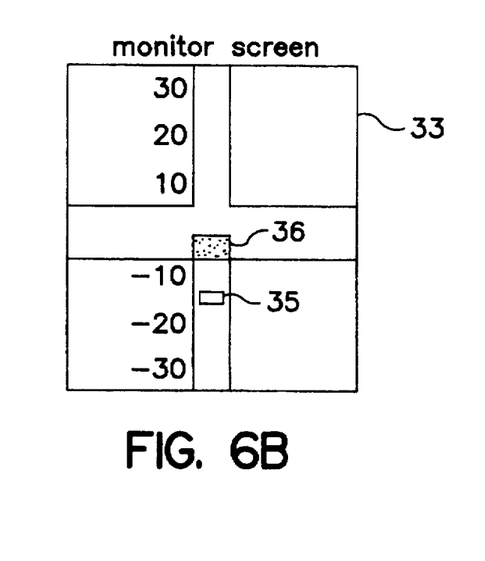
FIG. 6(b) illustrates pictures on a display monitor after introducing drift compensation data in accordance with the exemplary embodiment of the present invention.

FIGS. 6(a) and 6(b) illustrate pictures on a display monitor 27 of a purity adjusting apparatus using beam position simulation in accordance with the exemplary embodiment of the present invention shown in FIG. 1. The mark 34 is an aiming position of a reference drift on a displayed picture 33. The mark 35 is a marker for adjustment on the same displayed picture 33. The mark 36 is an optimum aiming position on the displayed picture 33 after the temperature and brightness drifts are compensated. Purity can be adjusted even when the shadow mask is being heated and expanding, by calculating conditions to stabilize the CRT at computing part 23, displaying the optimum aiming position 36 on the display picture 33 and moving the adjusting marker 35 to inside the optimum aiming position 36, by sliding a deflection yoke forward or backward on the CRT neck. In FIGS. 6(a) and 6(b), the ordinate indicates a deviation of the beam landing position in µm.

In the exemplary embodiment, because the beam landing position is converted into a y ordinate value defining x=0 at coordinate transformation, both the adjusting marker 35 and the optimum aiming position 36 move on the displayed picture 33 up- or downward at the center of the displayed picture 33.

Figure 7:
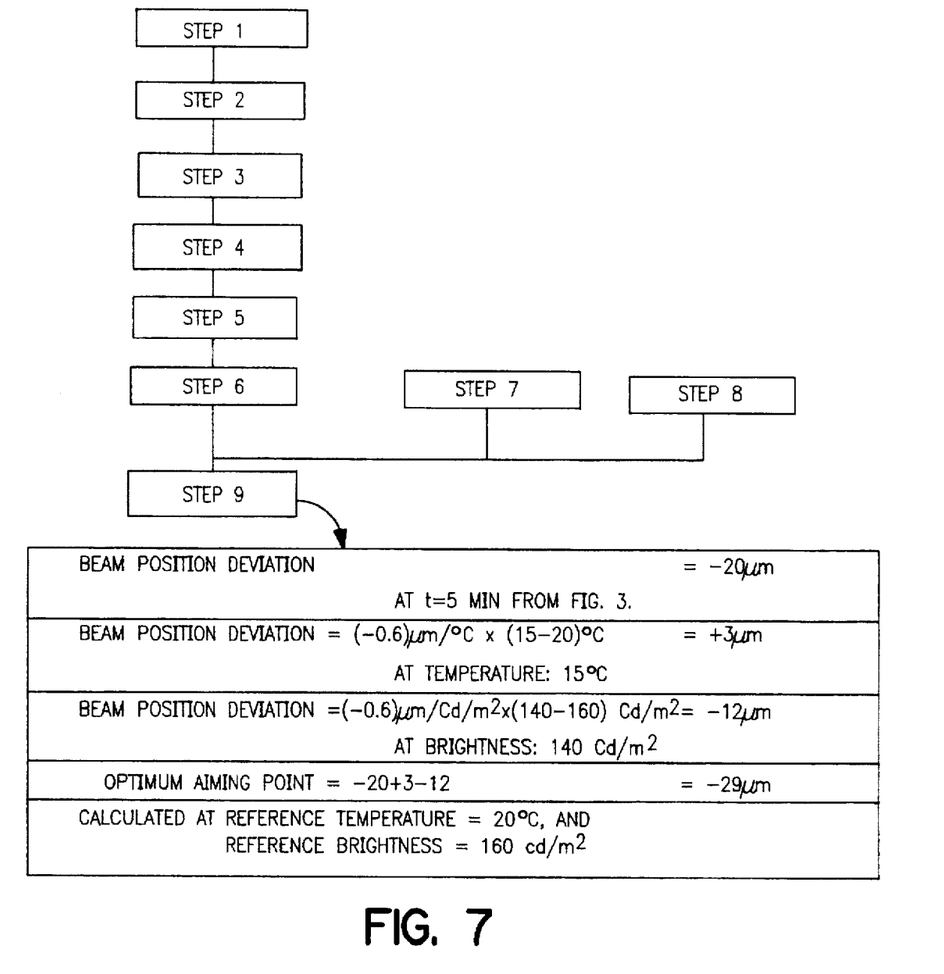
FIG. 7 is a flow chart indicating a beam landing position simulation process of a purity adjusting apparatus in accordance with the exemplary embodiment of the present invention.

FIG. 7 is a flow chart indicating a simulation process at a purity adjusting apparatus using beam position simulation in accordance with the exemplary embodiment of the present invention.

A television receiver is turned on (Step 1), the time data which the receiver is turned on is written in a time memory card 8 at E/O converter 7 (Step 2), the time data which the receiver starts conducting is read from the time memory card 8 at O/E converter 9 (Step 3) and the conducting time is calculated at a time measuring circuit 12 (Step 4).

Reference drift data is read from a floppy disk 14 at a reference drift data reading circuit 15 (Step 5) and the reference drift data at a purity adjusting instant is calculated at a time characteristic calculation circuit 16 (Step 6). A temperature drift compensation value is calculated at a temperature compensation calculation circuit 21 (Step 7), a brightness drift compensation value is calculated at a brightness compensation calculation circuit 22 (Step 8) and an optimum aiming position is calculated at a total compensation calculation circuit 24.

For example, taking 20° C. and 160 Cd/m$^2$ as the reference temperature and the reference brightness, respectively, when the conducting time is 5 minutes, the temperature of the CRT faceplate is 15° C. and the brightness is 140 Cd/m$^2$, the reference drift is −20 µm from the actually measured data (Step 6), temperature drift compensation =           (Step 7)

−0.6 µm/°C. × (15 − 20) °C. = +3 µm,

-continued and brightness compensation = (Step 8)

$$-0.6\ \mu m/Cd/m^2 \times (140 - 160)\ Cd/m^2 = -12\ \mu m.$$

Therefore, the optimum aiming position = reference drift + temperature drift compensation + brightness drift compensation =

$$-20\ \mu m + 3\ \mu m - 12\ \mu m = -29\ \mu m.$$

In general, there was a problem that purity adjustment had to be performed after the shadow mask reached a sufficiently stable state, because the shadow mask deforms due to self-heat dissipation and the environmental temperature and the beam landing position drifts. According to the exemplary embodiment of the present invention, the purity can be adjusted without waiting for the thermal stabilization of the shadow mask, by utilizing the fact that the shadow mask deformation due to internal heat dissipation and the environmental temperature occurs linearly and by making the deviation (drift) value of the beam landing position a coefficient. By expressing the thermal deformation of the shadow mask due to a CRT's heat dissipation as a coefficient every moment, the aiming point can be displayed on a screen and the adjustment accuracy can be improved by modifying the reference aiming point according to the brightness and the environmental temperature when purity is adjusted.

According to the present invention, an effective result is obtained in that the conducting time of the CRT until purity adjustment is shortened as well as the accuracy of the beam landing position is improved by presuming a perfectly stable state of the shadow mask using a computer while reaching the stable state, utilizing the temperature characteristic of the shadow mask.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An apparatus for adjusting color purity of a color cathode ray tube using beam position simulation comprising:

time measuring means for measuring a conducting time from a time when a conduction starts to a time when the purity of the color cathode ray tube of a color television receiver is adjusted;

reference drift data calculating means for storing data indicating a relation between a landing position deviation of an electron beam due to a thermal expansion of a shadow mask inside said color cathode ray tube by heat generated when the electron beam passes through said shadow mask and said conducting time and calculating reference drift data for a reference temperature and a reference brightness on an electron beam landing position at the time when the purity is adjusted from the conducting time data supplied from said time measuring means;

temperature/brightness measuring means for measuring a temperature and a brightness on a faceplate of said color cathode ray tube;

computing means for calculating an optimum beam landing position for the electron beam to strike phosphor of a designated color when the purity is adjusted and for converting the data of the calculated optimum beam landing position into (X, Y) coordinates data, being inputted with the temperature data and the brightness data supplied from said temperature/brightness measuring means and the reference drift data supplied from said reference drift data calculating means; and display means for displaying an aiming position on the (X, Y) coordinates indicating the optimum beam landing position supplied from said computing means and displaying a marker on the (X, Y) coordinates indicating the beam landing position;

wherein purity is adjusted corresponding to said designated color by making said marker coincide with said aiming position.

2. An apparatus for adjusting color purity of a color cathode ray tube using beam position simulation as recited in claim 1, wherein the time measuring means comprises:

a timing signal generator for generating a timing signal to measure the conducting time of said color cathode ray tube;

a first controller for converting the timing signal supplied from said timing signal generator into a digital data;

an electro-optical (E/O) converter for converting a first electric signal outputted from said first controller into an optical signal and writing said optical signal in a time memory card attached to a palette which said color television receiver is put on;

an optical-electrical (O/E) converter for reading the timing signal stored in said time memory card and converting the read optical signal into a second electric signal;

a second controller for converting the output signal of said O/E converter into an original timing signal; and a time measuring circuit for measuring the conducting time from the time when the conduction starts to the time when the purity is adjusted, from the output signal of said second controller.

3. An apparatus for adjusting color purity of a color cathode ray tube using beam position simulation as recited in claim 1, wherein the reference drift data calculating means comprises:

a floppy disk for storing a typical characteristic indicating relations between the landing position deviation of the electron beam and the conducting time of said color cathode ray tube;

a reference drift data reading circuit for reading said typical characteristic from said floppy disk; and a time characteristic calculation circuit for calculating a typical beam landing position deviation at the time when purity is adjusted from the data supplied from said reference drift data reading circuit, being inputted with the data of the conducting time from said time measuring means.

4. An apparatus for adjusting color purity of a color cathode ray tube using beam position simulation as recited in claim 1, wherein the temperature/brightness measuring means comprises:

a thermometer for measuring the temperature of the faceplate of said color cathode ray tube;

a brightness sensor for measuring the brightness of said color cathode ray tube; and an A/D converter for converting the temperature and brightness data measured at said thermometer and said brightness sensor into a digital data.

5. An apparatus for adjusting color purity of a color cathode ray tube using beam position simulation as recited in claim 1, wherein the computing means comprises:

a temperature compensation calculation circuit and a brightness compensation calculation circuit for compensating the deviation of the beam landing position by comparing the digital data of the temperature and the brightness supplied from said temperature/brightness measuring means with the reference temperature and the reference brightness when a typical characteristic indicating the deviation of the beam landing position for the conducting time of the color cathode ray tube is determined;

a total compensation calculation circuit for calculating an optimum beam landing position data at the time when purity is adjusted from the typical deviation data of the beam landing position at the time when purity is adjusted and the temperature compensation value and the brightness compensation value supplied from said temperature compensation calculation circuit and said brightness compensation calculation circuit; and a coordinates data calculation circuit for converting the typical data for the optimum beam landing position supplied from said total compensation calculation circuit and brightness digital data in the output supplied from said temperature/brightness measuring means into (X, Y) coordinates data.

* * * * *